(12) United States Patent
Mohan

(10) Patent No.: US 7,422,402 B2
(45) Date of Patent: Sep. 9, 2008

(54) ANCHORING DEVICE

(75) Inventor: James Patrick Mohan, 3140 Royal Ave, N. Van., B.C. (CA) V7K 1Y8

(73) Assignee: James Patrick Mohan, North Vancouver (CA)

( * ) Notice: Subject to any disclaimer, the term of this patent is extended or adjusted under 35 U.S.C. 154(b) by 17 days.

(21) Appl. No.: 11/300,564

(22) Filed: Dec. 15, 2005

(65) Prior Publication Data

US 2007/0140806 A1    Jun. 21, 2007

(51) Int. Cl.
*B60P 7/08* (2006.01)
(52) U.S. Cl. ...................................... 410/116; 410/101
(58) Field of Classification Search .................. 410/97, 410/101, 106, 110, 116; 24/136 R, 115 K, 24/265 CD, 194, 115 M, 265 A, 265 BC, 24/265 AL; 248/499
See application file for complete search history.

(56) References Cited

U.S. PATENT DOCUMENTS 5,330,300 A * 7/1994 Jones et al. .................. 410/106
6,168,360 B1 * 1/2001 Knox .......................... 410/96

* cited by examiner

*Primary Examiner*—Stephen Gordon

(57) ABSTRACT

Disclosed is an exemplary anchoring device for operating with a belt. The anchoring device includes a first member defining a first planar surface, a second planar surface and a curved surface. The anchoring device also includes a frame. The belt is engagable around the curved surface to bias the first member toward the frame, such that the belt is between the first planar surface and the frame, and the belt is between the second planar surface and the frame.

15 Claims, 3 Drawing Sheets

ANCHORING DEVICE

BACKGROUND OF THE INVENTION

1. Field of the Invention

This invention relates to anchoring devices, and in particular to an apparatus and method for securing together a web belt, or hook to the anchoring device, e.g. as used in the transportation industry.

2. Summary of Related Art

There are many anchoring devices available for use with web belts or straps. Most of these devices accommodate belts or straps which are looped through an accommodating slot on the device placed together, and then stitched.

In the U.S. Pat. No. 6,168,360 by Kinedyne Corp Kaptive hook is disclosed. This art shows a web belt looped through an opening in the hook and stitched.

It is the object of the present invention to provide an improved anchoring device or hook, that can be attached to a web belt without stitching.

SUMMARY OF THE INVENTION

According to the first aspect of the invention, there is provided an anchoring device comprising a frame having a formed v shaped slotted cavity at one end. The device further has a rounded open area for the purpose of attaching or hooking, on the upper portion of the frame.

According to another aspect of the invention, there is provided a v shaped wedge with matching angles to the v shaped cavity, along with a latching mechanism held in place with a cap screw on the side of the frame.

This invention allows a web belt to placed through the slotted opening and looped around the wedge. The belt is then wedged between the angled v frame and the wedge.

The anchoring device of this present invention can advantageously secure a web belt without the need for stitching.

BRIEF DESCRIPTION OF THE DRAWINGS

The present invention will be more readily understood from the following description of preferred embodiments thereof given, by way of example, with reference to the accompanying drawings, in which.

DETAILED DESCRIPTIONS OF THE PREFERRED EMBODIMENTS

Figure 1:
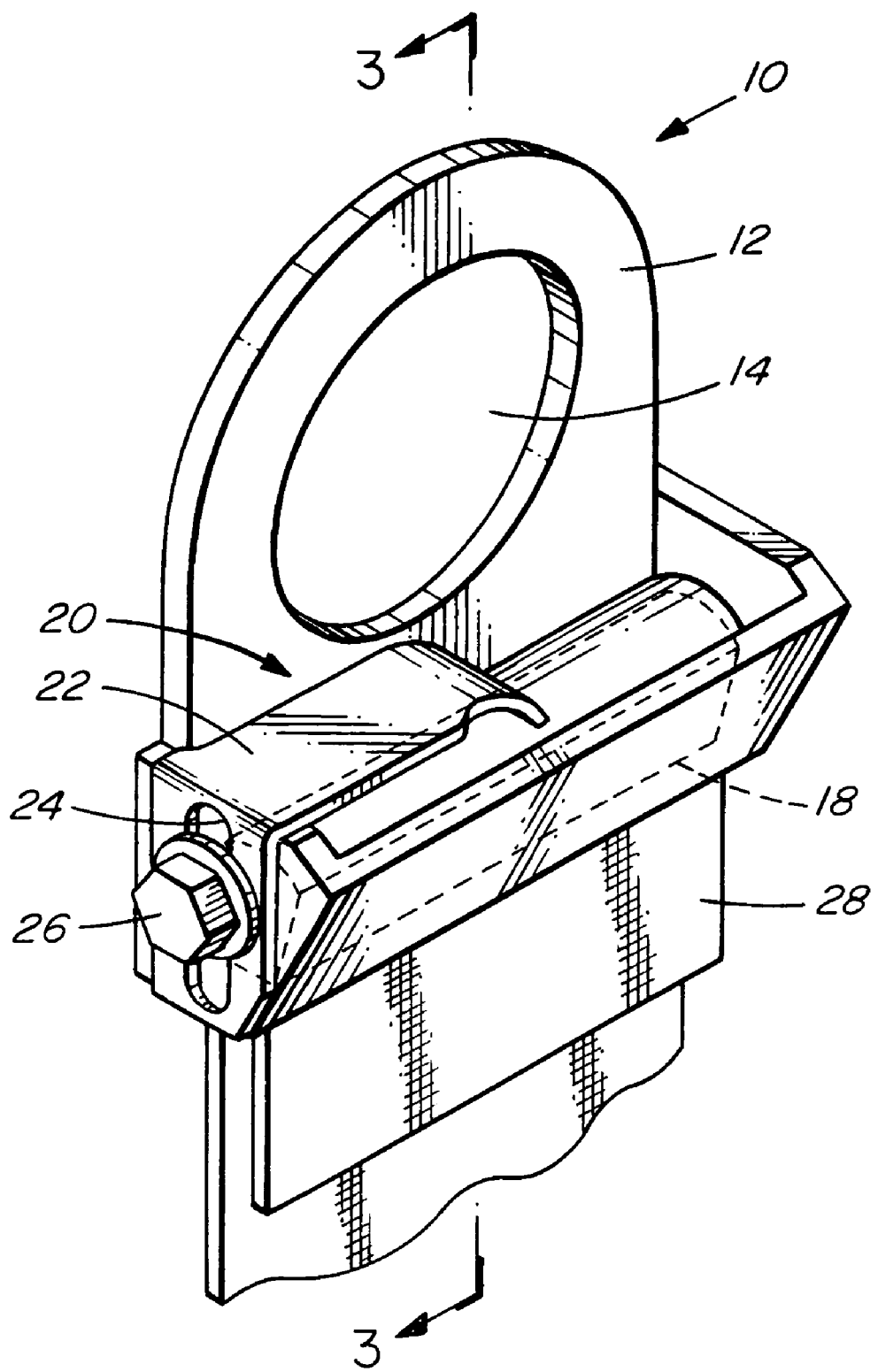
FIG. 1 is a frontal view of a preferred embodiment of an anchoring device.
Figure 2:
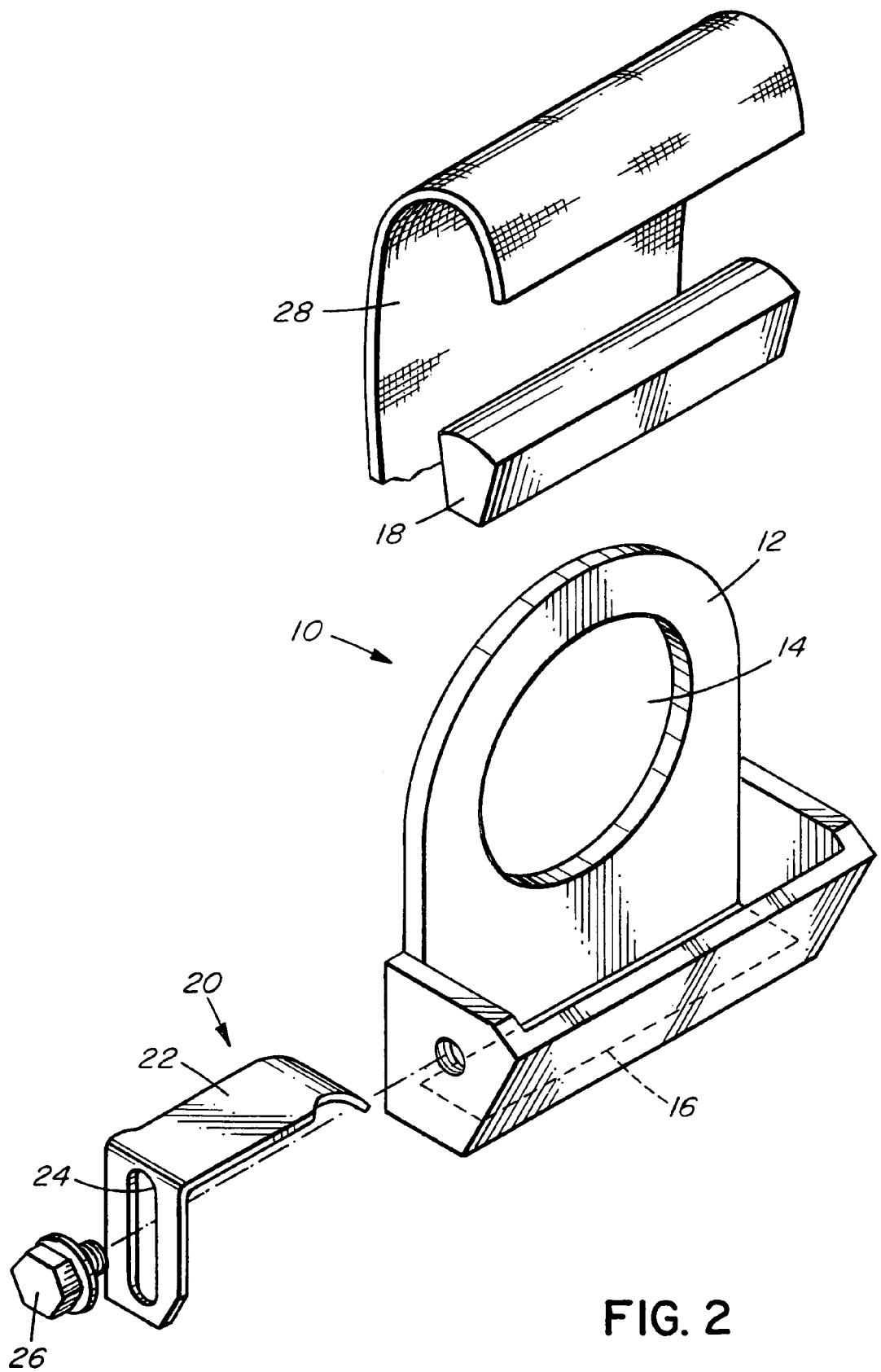
FIG. 2 is an exploded view of the anchoring device, with adjustable latch and cap screw of FIG. 1.
Figure 3:
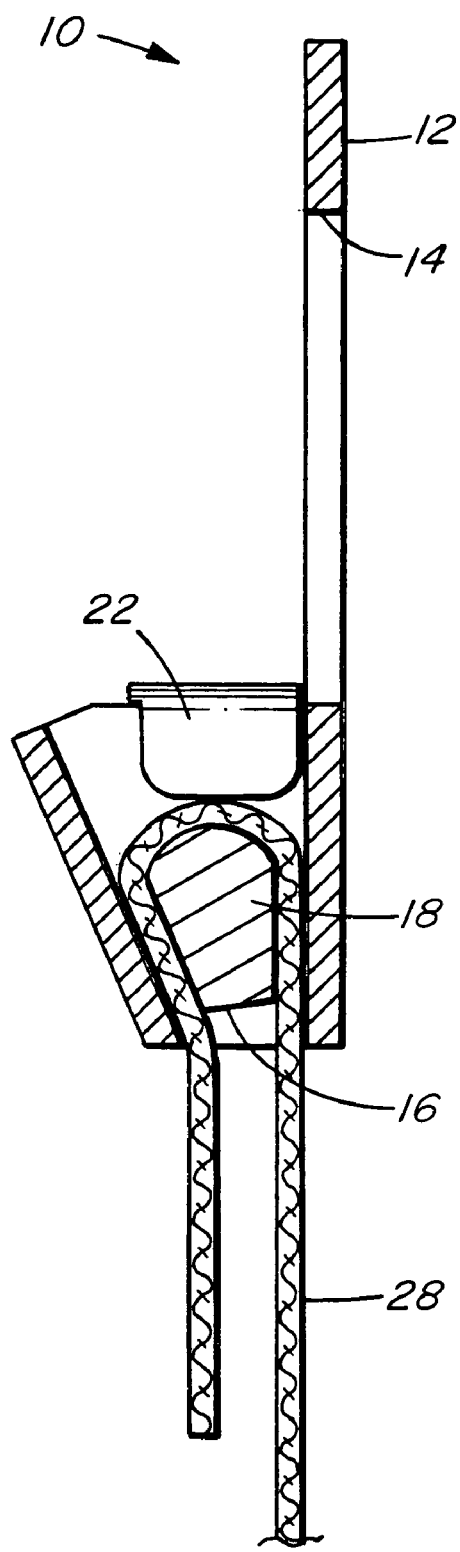
FIG. 3 is a side view of a preferred embodiment of an anchoring device of FIG. 1.

With reference to the figures and first to FIG. 1. An anchoring device indicated generally by reference numeral 10 has a frame formed that way by bending, welding, or casting. The preferred way being electric welded. The device further has a hole 14, placed in the upper portion 12 of the frame for anchoring or hooking.

With reference to FIG. 1, an adjustable latching mechanism 20 with a cap screw 26, latch bar 22, and a slotted place 24 for up and down adjustment, held in place with the cap screw 26.

The wedge bar 18 corresponds to the v shape formed in the frame, for the purpose of securing the web belt 28 when urged against the corresponding v shaped frame.

The anchoring device is operable by placing the web belt 28 up through the slotted base, then forming a loop by placing the end of the belt back down and in through the slot 16, and inserting the wedge bar 18 through the loop, then pulling the web belt into the pocket. Secure the latch 20.

There are two areas of gripping pressure created when the v bar 18 is urged against the walls of the pocket, by the pull of the belt 28.

This anchoring device can advantageously secure a web belt in place, without the need for stitching. As will be apparent to those skilled in the art.

Various modifications may be made within the scope of the appended claims.

What is claimed is:

1. An assembly for operating with a belt, the belt defining a belt width, the assembly comprising:
   a frame; and
   a first member defining
      a first planar surface,
      a second planar surface, and
      a curved surface,
   wherein the belt is engagable around the curved surface to bias the first member toward the frame, such that the belt is between the first planar surface and the frame, and the belt is between the second planar surface and the frame,
   the frame defining a passage sufficiently small to prevent the first member from passing through the passage, the passage being sufficiently large to allow the belt width to pass through the passage.

2. The assembly of claim 1 wherein the first member further defines a first end, and a second end opposed to the first end, the first and second ends not being engaged with the frame when the belt is engaged around the first surface.

3. The assembly of claim 2 wherein each of the first and second ends is a planar surface.

4. The assembly of claim 1 wherein the frame further defines a second passage sufficiently large to allow the first member to pass through the second passage.

5. The assembly of claim 1 wherein the frame further defines a second passage sufficiently large to allow the first member to pass through the second passage, and the assembly further includes
   a second member, positioned to prevent the first member from passing through the second passage, the second member being movable to allow the first member to pass through the second passage.

6. The assembly of claim 5 wherein the second member can be positioned such that the first member is between the second member and the sufficiently small passage of the frame.

7. The assembly of claim 5 wherein the second member defines a slot, and the assembly further includes a screw engaged with the frame through the slot, to fix the position of the second member relative to the frame.

8. The assembly of claim 1 wherein the frame defines a v shape at one end, and the first member includes a wedge bar corresponding to the v shape.

9. The assembly of claim 1 wherein the frame defines a tapered shape, and the first planar surface is not parallel to the second planar surface.

10. The assembly of claim 1 wherein the frame defines a hole configured to attach the assembly to a structure.

11. The assembly of claim 1 wherein a thickness of the first member is defined by a maximum distance between the first and second planar surfaces, and the passage has a first dimension sufficiently small to prevent the thickness of the first member from passing through the passage, and a second dimension sufficiently large to allow the belt width to pass through the passage.

12. A method of operating with a belt defining a belt end and a belt width, and an assembly comprising:
   a first member defining
      a first planar surface
      a second planar surface, and
      a curved surface; and
   a frame, the frame defining an passage sufficiently small to prevent the first member from passing through the passage, the passage being sufficiently large to allow the belt width to pass through the passage; and the method comprising:
   placing the belt end through the passage;
   forming a loop by placing the belt end back through the passage;
   pulling the belt such that the belt is engaged around the curved surface to bias the first member toward the frame, such that the belt is between the first planar surface and the frame, and the belt is between the second planar surface and the frame.

13. The method of claim 12 further including attaching the frame to a structure.

14. The method of claim 12 further including inserting the first member into the loop.

15. The method of claim 12 wherein a thickness of the first member is defined by a maximum distance between the first and second planar surfaces, and
   the passage has a first dimension sufficiently small to prevent the thickness of the first member from passing through the passage, and a second dimension sufficiently large to allow the belt width to pass through the passage.

* * * * *